United States Patent Office 3,464,543
Patented Sept. 2, 1969

3,464,543
SHOCK-RESISTANT HIGH-TEMPERATURE RESISTANT-PRESSURE-SENSITIVE-ADHESIVE INSULATION
Philip Kwiatanowski, Jr., Somerville, N.J., and Theodore L. Shebs, Saratoga, Calif., assignors to Johns-Manville Corporation, New York, N.Y., a corporation of New York
No Drawing. Original application Feb. 1, 1961, Ser. No. 86,335, now Patent No. 3,249,579, dated May 3, 1966. Divided and this application Oct. 23, 1965, Ser. No. 513,890
Int. Cl. B65h 55/00, 75/02; B65d 85/04, 85/66
U.S. Cl. 206—59                                 5 Claims

ABSTRACT OF THE DISCLOSURE

A shock-resistant and high temperature-resistant adhesive insulation such as an asbestos sheet of cloth having coated thereon a thermoinsulating-composition such as about 43% 2-chlorobutadiene polymer, about 42% clay, about 5% chlorinated hydrocarbon tackifier, about 8% carbon black, and the remainder aging and antioxidant compounds.

---

This application is a division of U.S. Letters Patent application Ser. No. 86,335 filed Feb. 1, 1961 and now Patent No. 3,249,579 issued May 3, 1966.

This invention relates to an improved adhesive and insulating composition. More particularly, it relates to a novel type of composition characterized by improved heat resistant and heat decomposition characteristics, which composition may be adapted as a pressure-sensitive adhesive. This invention is especially concerned with the use of such materials in conjunction with the insulation and protection of components associated with rockets, missiles and the like, which insulation is subjected to thermal shock and high temperatures.

As is generally understood, the firing of rockets, missiles and the like, is accompanied by a substantial amount of heat and pressure. Extensive research and development programs have been continually carried out to afford the best materials capable of withstanding the extraordinarily high heat and pressure. Not only must the surrounding components of rocket and missile motors be insulated, but additionally, all other elements which may in some manner be exposed to the atmospheric heat and pressure, must likewise be properly insulated and protected.

With regard to the present insulation systems, it is generally required that the material be cured under substantial heat and pressure in order to secure a proper bond to the rocket shell and to bond the layers of the material together. This curing prior to the firing, of course, necessitates a substantial amount of time and thereby increases the cost of manufacture of each missile. Accordingly, an insulating material which could be applied without necessitating any pre-firing curing would be of great benefit to the missile industry.

Another area wherein adequate insulation and protection is required is with regard to the umbilical cables. In the firing of rockets or missiles, the associated high temperature, thermal shock, and high velocity of the gases, have in the past caused considerable damage to these cables. In many situations, the cables have become completely unusable after the initial firing, thereby necessitating costly replacements having regard not only to the cost of materials per se, but also to the cost in time lost. Where the cables have been found not to be destroyed completely, a great deal of very expensive repair has been required in order to restore the cable to a workable condition. Again the desire for cost reduction is apparent. In this regard it is believed that if a composition could be applied to the cables which would properly resist the thermal shock and associated temperature, the cables could remain in an operable condition through several successive firings, thereby greatly enhancing the economics of the process.

It is concluded that a pressure-sensitive composition, generally in the form of a laminated sheet or tape, might solve this problem. To date, however all of the compositions considered have proved to be unsatisfactory as they could not properly resist the conditions surrounding the firing.

It is therefore a principal object of the present invention to provide a thermal insulating and adhesive composition which will overcome the foregoing disadvantages while providing suitable characteristics.

It is an additional object of this invention to provide a thermal insulating composition possessing new and improved heat and shock resistant characteristics.

It is another object of this invention to provide a novel composition of matter which may be especially adapted as a pressure-sensitive thermal insulating composition.

It is still another object of this invention to provide a pressure-sensitive adhesive composition which may be applied to the internal structure of various components of a rocket such as the motors, or other firing mechanism, which composition does not necessitate a pre-firing curing in order to insure proper bonding to the shell.

A still further object of this invention is to provide a new pressure-sensitive adhesive composition which may be used to insulate umbilical cables in order to impart substantially improved protection during the firing of missiles and the like.

To the accomplishment of these objects and to such others that may hereafter appear, the invention comprises the features set out in the following description.

The above objects are realized by our invention, which, briefly stated, comprises a new thermal insulation which is extremely fire-resistant and additionally is pressure-sensitive. More specifically, the composition comprises neoprene; a fire-resistant tackifier, such as Aroclor resins, inert filler, such as asbestos fiber, carbon black, or clay; and non-flammable solvent, such as tetrachloroethylene. Additional components may be added, such as pigments, fillers, and associated pressure-sensitive adhesives, dependent on the permissible cost and the desired characteristics of the final product.

The practice of this invention is further illustrated by the following example, wherein the parts are in percentage by weight unless otherwise indicated:

A mixture of materials with the following percentages:

| | Percent |
|---|---|
| Neoprene WRT | 43.0 |
| Magnesium oxide | 1.4 |
| Antioxidant, such as Neozone D | 1.0 |
| Carbon black | 7.6 |
| Clay | 41.8 |
| Tackifier | 5.0 |
| Reclaiming agent | 0.2 | was loaded in a Banbury mixer, and a ram pressure of 40 p.s.i.g. was applied. A pointer setting of 230° F. was employed under high speed conditions. The mixer was run for a total of 4 minutes. The resulting mixture was added to a tumbler-churn containing the tetrachloroethylene. Sufficient solvent was supplied so as to amount to 82.7% of the final composition. The mixture was churned for approximately 24 hours until smooth.

Tests were run to evaluate the effectiveness of the composition of the instant invention. Samples were made by applying the composition prepared according to the above procedure to an asbestos cloth so that the finished article was approximately 50 percent asbestos fiber. The resultant article was compared with a Neoprene coated asbestos cloth and a Neoprene coated cotton cloth, the percentages of fiber being substantially the same. Samples were prepared by making ten strips of each material 1 in. by 7 in. The strips were single-plied and joined together with an approximately ¼ in. overlap to form a sheet approximately 7 in. by 7 in. The sheets were subjected to vibration at a rate of 2000/min. of ⅛ in. amplitude for 15 minutes. A flame of 2000° F. was applied to the vibrating sample. The Neoprene coated cotton cloth burned, leaving a 3 to 4 in. hole. The Neoprene coated asbestos cloth, while it did not burn, was characterized by severe delamination, allowing the flame to penetrate the laps. The article produced according to the instant invention did not burn nor did it delaminate. The test procedure used was quite similar to present CCA test procedure.

The following disclosure sets forth the various alternative compositions or compounds among those preferred materials useful within the scope of the instant invention.

With regard to the rubber component, the chloroprenes or chlorinated rubbers are preferred. The preparation of polychloroprene from chloroprene is well known. After suitable purification by careful fractionation, chloroprene is emulsified in water by means of sodium rosinate soap and polymerized at 40° C. with the aid of potassium persulfate as a catalyst, and in the presence of elemental sulfur as a modifier.

Moreover, chloroprene can be copolymerized with relatively small amounts of other monomers. For example, styrene comonomer tends to make a polychloroprene with less crystallization tendency, isoprene comonomer tends to make for better low-temperature service, and acrylonitrile for good processibility and oil resistance.

Examples of suitable chloroprene (2-chloro-butadiene) polymers useful in accordance with this invention are the Neoprene rubbers. Neoprene is a generic name applied to polymers of chloroprene or mixtures of chloroprene and other polymerizable monomers, the major constituent of which is chloroprene.

Specific examples of polychloroprene lattices are those sold under the trade names of "Neoprene WRT," "Neoprene 571," "Neoprene 842-A," "Neoprene 601-A," "Neoprene 735," and "Neoprene 572." All of these lattices are alkaline dispersions of polymerized chloroprene (2-chloro-1,3-butadiene) in water containing dispersing and stabilizing agents.

Other usable chlorinated rubbers suitable for practicing the present invention may be of the commercial type of product made and sold under the trade name of Parlon.

The tackifier component is preferably of a fire-resistant or fire retardant hydrocarbon composition. Particularly useful are the Aroclor compositions. This material consists of a series of chlorinated hydrocarbons which may vary from water-white liquids and like colored oils to amber colored resins and crystalline solids. These materials may be represented by the following series:

Any flame retardant substance, however, may be used in the practice of the invention which is capable of imparting tack and/or adhesive to the rubber. The highly chlorinated organic flame resistant substances may be any one of several types of chlorinated organic materials, such as chlorinated oils of vegetable or animal origin, chlorinated paraffin wax or wax-like substances and the like. The best results are obtained where the compound contains a majority of chemically combined chlorine.

The antioxidant may be any one of many well known commercially available materials such as phenyl beta naphthylamine made and sold under the trademark "Neozone D," and p-(p-tolyl-sulfonylamido)-diphenylamine made and sold under the trademark "Aranox." "Poly-pale Ester 10" is a glycerol ester of polymerized rosin. "Pentalyn H" is a modified pentaerythritol ester of rosin. Zinc butyl xanthate, also useful, may be obtained under the trademark "ZBX."

Various types of filler materials may be used in addition to the clay and carbon black of the above example, it being important that the majority of the filler component be selected from the class of inert materials. Inert fire retardant inorganic or mineral fillers which may be used include fibrous fillers, such as glass fibers, asbestos, various silicate fibers, and known fillers, such as whiting, clay, ground glass, kaolin and the like.

The solvent material employed is a non-flammable hydrocarbon exemplified by the commercially available chlorinated solvents, such as carbon tetrachloride, trichloromonofluoro ethylene and the like. Particularly useful is the tetrachloroethylene solvent.

The procedure generally followed for preparing a composition comprises pre-mixing the rubber and the insoluble materials of the formulation in a mill or mixing machine, such as a Banbury mixer. The mixed product is then dispersed in the solvent together with any liquid components.

The important ingredients in the composition are the rubber, filler and solvent components. The rubber is preferably a Neoprene W product because of the good tack retaining characteristics of that material. It is preferred that the rubber constituent be between about 35% to about 55% by weight of the dry composition. The remainder of the dry composition should consist essentially of an inert filler. The purpose of the ranges is to spell out the best products, but materials may be prepared outside the range if one wishes to sacrifice various properties. That is, if too much filler were to be used, the composition would lose its tack and thereby lose part of its very desirable characteristics. Conversely, if too much rubber were to be used, the composition would become too tacky and thereby become difficult to handle. The amount of solvent to be used may likewise be varied so long as it remains consistent with the aims of the invention as herein spelled out.

While the composition of the invention is thought to consist essentially of two constituents, the composition is open for the inclusion of unspecified ingredients which do

TABLE I.—AROCLOR SERIES

| Aroclor No. | Form | Sp. gr. | Distillation range, °C. | Flash point, °F. | Fire point, °F. | Acidity, mg. KOH/g |
|---|---|---|---|---|---|---|
| 1232 | Practically colorless, mobile oil. | 1.265 | 290–325 | | | |
| 1242 | do | 1.378–1.388 | 322–365 | 348–356 | 633 | 0.01 |
| 1248 | Yellow tinted oily liquid | 1.447–1.457 | 330–370 | 379–384 | None | 0.01 |
| 1254 | Yellow tinted viscous oil | 1.538–1.548 | 365–390 | None | None | 0.01 |
| 1260 | Light yellow, soft, sticky resin | 1.618–1.629 | 385–420 | None | None | 0.015 |
| 1262 | Light yellow, sticky, clear resin. | 1.646–1.653 | 373–404 | None | None | 0.02 |
| 1270 | White, crystalline powder | 1.944–1.960 | 450–460 | None | None | 0.175 |
| 2565 | Brown-black opaque resin | 1.724–1.740 | | None | None | 1.26 |
| 4465 | Yellow, transparent, brittle resin. | 1.712–1.723 | | None | None | 0.05 |
| 5442 | Yellow, transparent, sticky resin. | 1.432–1.447 | | 477 | 662 | 0.028 |
| 5460 | Yellow, transparent resin | 1.740–1.745 | | None | None | 0.07 | not materially affect the basic and novel characteristics of the composition as heretofore described.

The remainder of the constituents are added to effect the most preferred embodiment. The plasticizer is used in the same manner as generally recognized and is chosen to impart adhesiveness to the composition and is selected for the particular tack properties desired.

The antioxidant functions to improve the aging characteristics of the rubber and to minimize its oxidation during subsequent storage. Likewise there may be added to the composition any reclaiming agents, metallic oxides, etc., all of which are useful in controlling the aging and tackiness of the composition. The amount so used may vary from nominal amounts to as much as 25% or more of the composition insofar as they do not affect too adversely the usefulness of the invention.

In preparing an article using the composition, the material to which it is to be applied, such as cloth or paper, is saturated with the insulating composition. The solvent is evaporated and the coated material is heated to cure the composition. The product may be made in various forms, either in large sheet size or in small, convenient, easily dispensable tape form.

Pressure-sensitive sheets or laminates utilizing the composition may be made in any of the well recognized manners now used commercially. The composition of the invention may be applied to any of the recognized bases, and preferably for purposes of the invention, to an asbestos paper. In one alternative the material may be coated upon the tacking material, partially cured in the normal manner. The material is then wound on rolls for subsequent use. Partial curing is most desirable so as to allow the product to remain in a workable or moldable condition.

One very important aspect of the instant invention is that while the product is applied in the final use in a partially cured state, no further work need be done at that time to effect the final product. This is so as the heat and other conditions associated with the blast or thermoshock positively effect the final cure. No prior art composition or insulation is known which functions in this very efficient and time-saving manner. Thus not only is the product completely workable during installation but requires no post-treatment on behalf of the installer.

Various materials may be used to act in the manner of a release agent. Coatings may be applied to the back side, care being taken, however, to avoid flammable materials. The preferred method, which removes any possible danger, is the use of a liner material. One satisfactory material found very effective is embossed polyethylene.

As will be readily appreciated by those skilled in the art, various variations in the selection of the individual ingredients of the insulating composition may be acceptable. Besides variation in the individual ingredients, many other variables are present in the process, such as the density of the solution, the particular nature of the material to be treated, the degree of treatment necessary, depending upon the particular solvent chosen, and the time and temperature at which the composition is cured. These controls in typical commercial processes are not readily susceptible to precise definition since various uncontrollable factors, such as the ambient atmospheric conditions may alter the process operation, but they will be well understood by those skilled in the art.

It is believed the above provides a complete description of the invention in such manner as to distinguish it from other inventions and from what is old, and provides a description of the best mode contemplated of carrying out the invention and thereby complies with the patent statutes.

What we claim is:

1. An article comprising rubber and inert filler, the improvement comprising a laminate of asbestos paper impregnated with a partially cured tacky composition consisting essentially of (1) chloroprene and (2) said inert filler being present in an amount insufficient for said composition to lose its tack, whereby said article has improved thermal insulation properties.

2. An article comprising a composition which is in sheet form, which is windable and unwindable substantially without delamination, and which consists essentially of a laminate of asbestos paper impregnated with a tacky partially cured rubber composition consisting essentially of chloroprene, and an inert filler present in an amount insufficient for said composition to lose its tack, whereby said article has improved thermal properties.

3. An article according to claim 2, in which said sheet is wound into a roll, in which said rubber composition includes an effective amount of a tackifier, and in which said article includes a layer consisting of a release sheet.

4. Thermal insulation comprising a sheet of asbestos impregnated with a tacky partially cured composition consisting essentially of, by weight, about 35% to 55% rubber selected from the group consisting of chlorinated rubber and chloroprene, at least about 45% inert filler, and about 5% chlorinated hydrocarbon tackifier.

5. Thermal insulation according to claim 4, in which said rubber comprises substantially 2-chloro-butadiene polymer at about 43% by weight of said tacky composition, in which said inert filler comprises substantially carbon black at about 8% of said tacky composition and in which said tacky composition includes an aging compound and an antioxidant compound.

References Cited

UNITED STATES PATENTS

| | | | |
|---|---|---|---|
| 1,950,894 | 3/1934 | Koch | 260—3.3 |
| 2,096,660 | 10/1937 | Winkelmann | 260—3.3 |
| 2,156,755 | 5/1939 | Gebauer-Fuelnegg | 260—3.3 |
| 2,309,185 | 1/1943 | Gordon | 260—3.3 |
| 2,973,286 | 2/1961 | Ulrich | 260—33.8 |
| 3,082,133 | 3/1963 | Hofmann et al. | 161—205 |
| 3,086,951 | 4/1963 | Wile | 260—33.8 |

EARL M. BERGERT, Primary Examiner

T. R. SAVOIE, Assistant Examiner

U.S. Cl. X.R.

161—205, 406; 117—126, 137